Oct. 12, 1948.                O. SCHLÄPFER                 2,451,242
          ELECTRIC GENERATING PLANT FOR THE DRIVE OF VEHICLES
Filed Oct. 2, 1945                              3 Sheets-Sheet 1
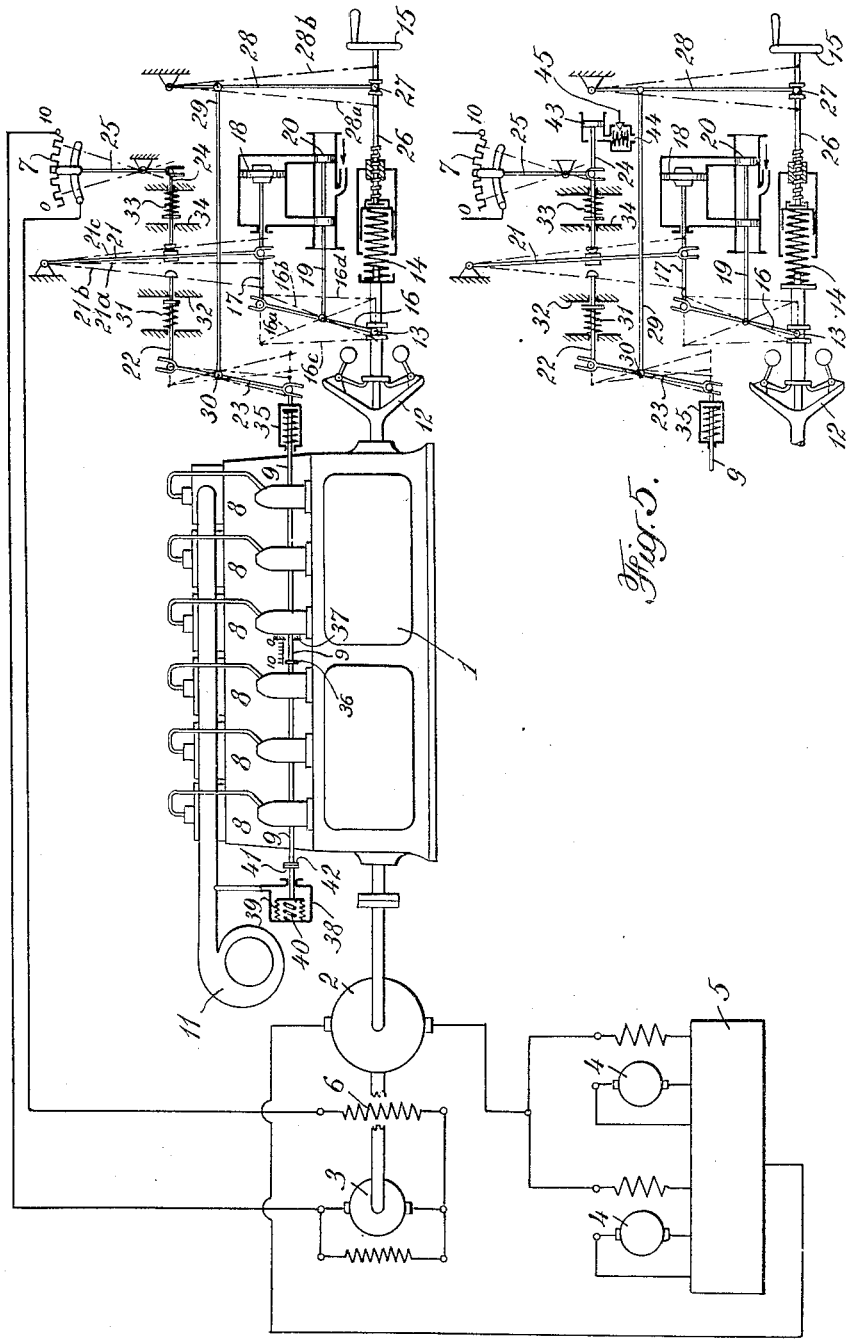
INVENTOR
OSKAR SCHLÄPFER
BY
Pennie, Davis, Marvin & Edmonds
ATTORNEYS

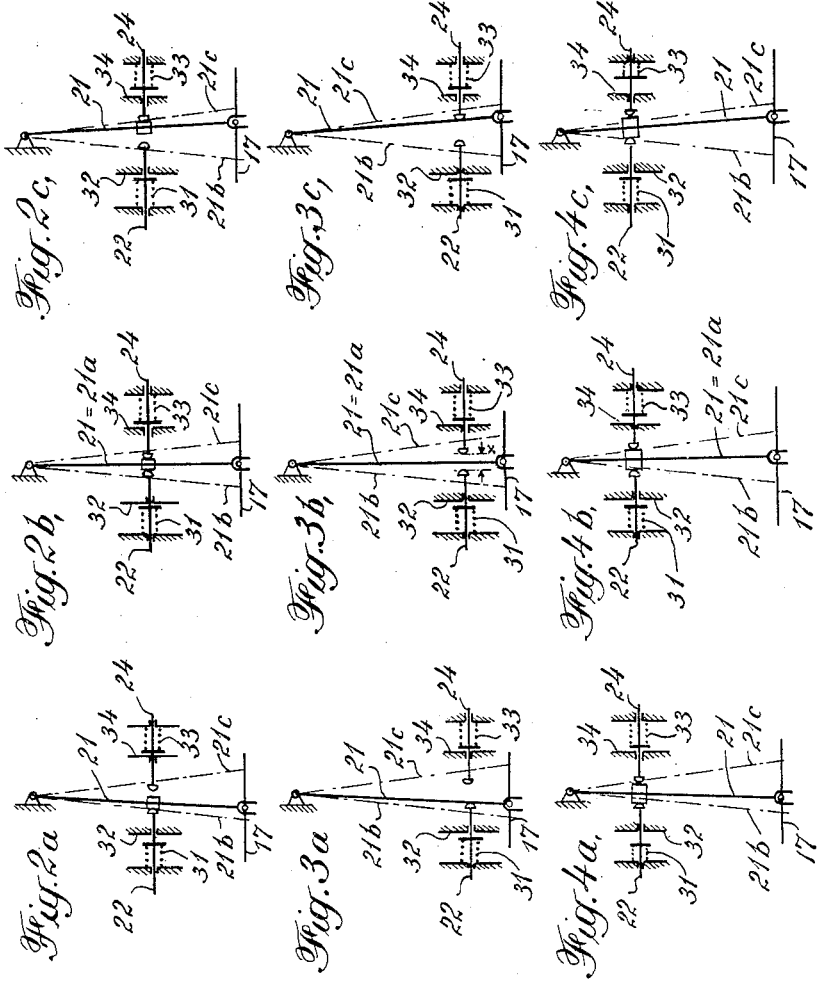

Oct. 12, 1948.    O. SCHLÄPFER    2,451,242
ELECTRIC GENERATING PLANT FOR THE DRIVE OF VEHICLES
Filed Oct. 2, 1945    3 Sheets-Sheet 3
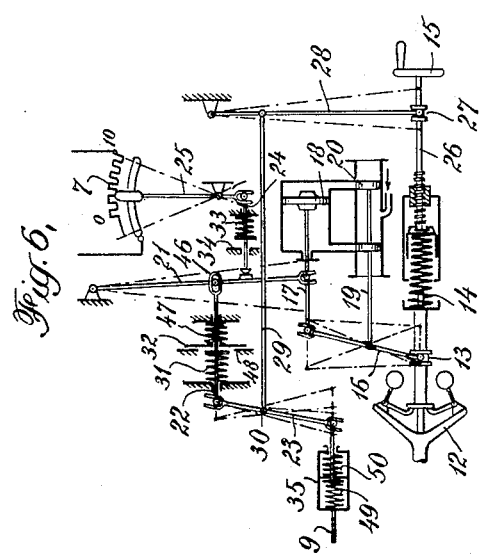
INVENTOR
OSKAR SCHLÄPFER
BY
Pennie, Davis, Marvin & Edmonds
ATTORNEYS Patented Oct. 12, 1948

2,451,242

UNITED STATES PATENT OFFICE 2,451,242

ELECTRIC GENERATING PLANT FOR THE DRIVE OF VEHICLES

Oskar Schläpfer, Winterthur, Switzerland, assignor to Sulzer Freres, Societe Anonyme, Winterthur, Switzerland Application October 2, 1945, Serial No. 619,797
In Switzerland January 15, 1945

7 Claims. (Cl. 290—40)

The invention relates to an electric generating plant for the drive of vehicles with an electric generator driven by an internal-combustion engine and an automatically acting governing device, which adjusts the fuel and the field current in accordance with the speed of the internal-combustion engine and the electric generator. Such plants are adapted particularly for driving rail vehicles, but may also be used, for instance, on road vehicles and water craft.

In plants of the type mentioned, if the quantity of fuel and the strength of the field current of the electric generator are adjusted simultaneously by the same governor, the drawback arises that the service points of such a plant, whose governing is in equilibrium, are situated so unfavourably as regards tractive effort and the speed of the vehicle, that the full output of the internal combustion engine and electric generator can only be utilised over quite a small speed range. With this very simple governing, if an astatic characteristic is given by adopting an auxiliary motor to adjust the field-current regulator, better utilisation of the full output of the internal-combustion engine and electric generator can be obtained. On the other hand, however, hunting will arise in the governing, since the field-current regulator can never get into a steady state because of the enforced astatic characteristic.

It has also been proposed to adjust the quantity of fuel as well as the field-current strength by regulators with an astatic characteristic, but to keep the ranges of adjustment separate from each other, so that in a region of lower load the fuel regulation alone, and in a region of higher load the field-current regulation alone would come into operation. But because of the astatic characteristic of both regulations, oscillations occur to an even greater degree, since the stabilising action of the fuel regulation is not present during regulation of the field-current.

According to the invention, it is proposed to adopt, in electric generating plants of the type described, a control device influenced by a speed governor and controlling the fuel and field-current regulators in such a way that, in a region of high speeds, a definite position of the fuel regulator absolutely corresponds to each position of the speed governor, and in a region of lower speeds a definite position of the field-current regulator absolutely corresponds to each position of the speed governor. Thereby the control device can at least during the greater part of the region of lower speeds keep the fuel regulator in the region of the position for maximum fuel feed, and at least during the greater part of the region of higher speeds keep the field-current regulator in the region of the position for maximum field-current.

In a third region of lowest speeds, the control device may again control the fuel regulator for instance in such a way, that a certain position of the fuel regulator is definitely allocated to each position of the speed governor.

The region of higher speeds in which the fuel regulator is influenced and the region of lower speeds in which the field-current regulator is influenced, may be directly connected together, or they may be separated by an intermediate region in which neither the fuel regulator nor the field-current regulator is influenced. These regions may, however, also overlap to a certain extent, and there both the fuel regulator and the field-current regulator are influenced.

Further an adjusting device may be provided with which the speed regions can be altered. By means of a further device, for instance, the quantity of fuel may be limited if the control device would adjust to a greater quantity of fuel when troubles occur, than is admissible with the supercharging pressure at the moment. Finally a device may also be adopted which, influenced by the starting device particularly in the region of lower speeds, adjusts to an increased quantity of fuel during starting.

The invention is further explained with the help of the drawing.

Fig. 1 shows as first example of execution an electric generating plant for driving a rail vehicle in which the regions of fuel regulation and field-current regulation are directly adjacent to each other.

Figs. 2a–c illustrate different positions of a control lever of the plant according to Fig. 1.

Figs. 3a–c show in the same manner as Fig. 2 the lever of a control device in which the speed region of field-current regulation is separated from the speed region of fuel regulation by a normal intermediate region in which neither of the regulating devices is influenced.

Figs. 4a–c illustrate, as Fig. 2, the lever of a control device in which the speed region of fuel regulation and the speed region of field-current regulation overlap to a certain extent.

The figures marked *a* in Figs. 2–4 show the positions in which only the fuel regulator is influenced, those marked *b* show the middle position between the two speed regions, and those marked c the positions in which only the field-current regulator is influenced.

Fig. 5 shows a control device for an electric generating plant in which the field-current regulator is equipped with a retarding device.

Fig. 6 illustrates a control device in which, in addition to the two normal speed regions of fuel regulation and field current regulation still a third speed region is provided beyond the region for field-current regulation; in it the fuel regulator is influenced again.

Fig. 7 shows a similar control device as in Fig. 6.

Fig. 8 represents a part of a control device for a supercharged internal combustion engine.

Fig. 9 shows a device for increasing the fuel feed at starting, which is influenced by the starting device.

The internal-combustion engine 1 as shown in Fig. 1 drives an electric generator 2 and an exciter 3. The current from the electric generating plant is used for driving the traction motors 4 of a rail vehicle. Between the electric generator 2 and the traction motors 4 the switch-gear required for working the vehicle (for instance reversing-switch, over-current relay, etc.) are arranged together in a block 5. The exciter 3 feeds the field coil 6 of the electric generator 2. For regulating the field-current, the regulating resistance 7 is provided which is short-circuited in the position 10 and has the greatest resistance inserted in the position 0.

Each working cylinder of the internal combustion engine 1 has a fuel pump 8. All fuel pumps are regulated in common by means of linkage 9. When the stop collar 36 takes up the position 10, shown on the scale associated with the linkage 9 in Fig. 1, at the left, the maximum quantity of fuel is delivered, while, if the linkage 9 shifts to the right, bringing stop collar 36 to the position 0, no fuel is delivered. By means of the supercharging compressor 11, which may be driven for instance by an exhaust gas turbine not shown, the combustion air is led to the internal-combustion engine 1 at an increased pressure.

For adjusting the fuel regulating linkage 9 and the field-current regulator 7, a speed governor 12 constructed as centrifugal governor is used. The sleeve 13 of this governor experiences through the spring 14 a loading which is adjustable by means of the hand-wheel 15. To the sleeve 13 the regulating lever 16 is jointed, which is jointed at the opposite end to the piston rods 17 of the servomotor piston 18 and in the middle to the rod 19 of the control valve 20. To the piston rods 17 of the servomotor piston 18 is also jointed the control lever 21, which makes it possible on the one hand to influence the linkage 22, 23, 9 of the fuel regulator and on the other hand the linkage 24, 25 of the field-current regulator 7.

To the spindle 26, by means of which the pressure on the sleeve of the speed governor 12 can be adjusted, a lever 28 is jointed by means of a sleeve 27 and adjusts the middle pivot 30 of the regulating lever 23 through a linkage 29.

By means of the control device, the fuel regulator 9 and the field-current regulator 7 are controlled through the speed governor 12, in accordance with the speed of the internal-combustion engine 1 and of the electric generator 2, in such a way that in a region of higher speeds a certain position of the fuel regulator is definitely allocated to each position of the speed governor, and in a region of lower speeds a certain position of the field-current regulator is definitely allocated to each position of the speed governor.

To each position of the speed governor 12 and the sleeve 13, a certain position of the servomotor piston is definitely allocated when the plant is in a steady state. The dotted lines 16a and 16b show the extreme limiting positions of the lever 16 in the steady state of the regulating device, whilst the dotted lines 16c and 16d shows the extreme limiting positions while the regulation is being adjusted. In this way also for each position of the speed governor 12 there is an absolutely definite position of the control lever 21 in the steady state. This lever 21, in a region between the position 21a and the limiting position 21b, influences the linkage 22, 23, 9 of the fuel regulator and in the region between the position 21a and the other limiting position 21c influences the linkage 24, 25 of the field-current regulator 7.

In the position of the control device shown in Fig. 1, the fuel regulator 9 is in the region for adjusting to the greatest quantity of fuel. In this case, the spring plate of the linkage 22 is held to the stop 32 by the spring 31. The position of the pivot 30 of the lever 23 is given by the position of the linkage 29. In this way, the position of the lever 23 is determined. The fuel regulator 9 then stands in a position which gives the greatest possible quantity of fuel for the speed region adjusted by the spindle 26. An influencing of the feed governor does not take place as long as the lever 21 remains in the region between the positions 21a and 21c.

The field-current regulator 7 is in a position between the positions 0 and 10. In this case the linkage 24 is brought into contact with the lever 21 by means of the spring 33. The two stops 32 and 34 are set in such a way that the spring plates connected to the linkages 22 and 24 come to lie on them exactly when the lever 21 reaches the position 21a. If the fuel regulator is influenced in the region of higher speeds, the field-current regulator remains unchanged in the region of the position for the strongest field-current.

With the help of the adjusting device 15, 26 the speed regions can be altered, whereby on the one hand only the fuel regulator and on the other hand only the field-current regulator is influenced.

If with the help of the handwheel 15 and the spindle 26, the spring 14 is given a greater tension, an increased speed of the internal-combustion engine is necessary in order to keep the lever 16 in the positions between the limiting positions 16a and 16b. At the same time, the lever 28 is pushed in a direction towards the limiting position 28a. The lever 21 then takes up its position 21a as compared with the former setting, only at a higher speed. At the same time, with the help of the linkage 29, the pivot 30 of the lever 23 is moved to the left, so that in this middle position an increased quantity of fuel is adjusted. The speed regions are thereby moved into regions of higher speeds. Within these new speed regions, the fuel and the field current regulators are again influenced in such a way, that in the region of higher speeds a certain position of the fuel regulator is definitely allocated to each position of the speed governor and in the region of lower speeds a certain position of the field-current regulator is definitely allocated to each position of the speed governor.

If with the help of the adjusting device 15, 26 the load on the spring 14 is decreased and the lever 28 is moved towards the limiting position 28b, the positions of the lever 16 lying between the limiting positions 16a and 16b are adjusted at the lower speed. The position 21a of the lever 21 will thereby be maintained between the two speed regions also at a lower speed than in the position shown in Fig. 1. Through the linkage 29 the pivot 30 of the lever 23 is moved towards the right, so that a smaller quantity of fuel is adjusted. The two regions are therefore moved into regions of lower speeds. Thereby in the region of higher speeds a certain position of the fuel regulator is definitely allocated to each position of the speed governor and in the region of lower speeds a certain position of the field-current regulator is definitely allocated to each position of the speed governor.

The position of the fuel pump regulator 9 cannot come into the position 0. For this purpose, a spring member 35 is provided in the linkage 9 and is pressed together after reaching the 0 position of the fuel regulator, if the lever 23 should be moved still further. The 0 position of the fuel regulating linkage 9 is determined by a collar 36 and the stop 37.

The device 38, which comes into action as a supercharging safety device, prevents thermal loading of the supercharged internal-combustion engine if, in consequence of a disturbance or outside the steady state, the supercharging pressure should be higher than what would correspond to the quantity of fuel set by the speed governor 12. If the supercharging pressure is higher than is necessary for the exact quantity of fuel adjusted, the bellows 39 and the spring 40 are pressed so far together, that the stop 41 is raised from the stop 42. But, if the supercharging pressure is too low, the spring 40 presses the fuel regulating linkage 9 over the stop 41, 42 to the right. The lever 23 is then turned counterclockwise, whereby the linkage 22 can be removed from the lever 21.

Through the reduction in the quantity of fuel, there is less output from the plant. The speed falls and the sleeve 13 of the governor 12 moves to the left. Then also the servomotor piston 18 and the lever 21 move towards the right, so that a part of the regulating resistance 7 is inserted. The load of the internal-combustion engine is thereby decreased and with the diminished load a new steady state is reached at a lower speed.

Fig. 2 shows the control lever 21 of Fig. 1 in various positions. In the positions according to Fig. 2a, in a region of higher speeds only the linkage 22 of the fuel regulator is influenced, whilst the spring plate of the linkage 24 for the field-current regulator lies on the stop 34. Fig. 2b shows the position 21a of the lever 21. In this position the spring plate of the linkage 22 for the fuel regulation and also the spring plate of the linkage 24 for the field-current regulation lie on the stops 32 and 34. Here then the linkage 22 and also the spring plate of the linkage 24 just touch the lever 21, so that between the linkage and the lever there is no clearance. In the position 2c only the linkage 24 of the field-current regulator is influenced in a region of lower speeds, whilst the linkage 22 of the fuel regulator lies with its spring plate on stop 32.

Fig. 3 shows the form of control device in which between the two speed regions a small intermediate region is inserted, in which neither the fuel regulator nor the field-current regulator is influenced. The positions according to Figs. 3a and 3c correspond to the positions according to Figs. 2a and 2c, in which on the one hand only the fuel regulator is influenced, and in the other hand only the field-current regulator. From Fig. 3b it can be seen that between the two positions of the linkages 22 and 24, in which their spring plates rest on the stops 32 and 34, an intermediate region x exists in which the lever 21 does not touch either of the two linkages.

In the form of control device according to Fig. 4, the two speed regions, in which the fuel regulator on the one hand and the field-current regulator on the other hand are influenced, overlap near their ends. The positions 4a and 4c again correspond to the positions 2a and 2c. In the middle position according to Fig. 4b, however, neither the spring plate of the linkage 22 nor the spring plate of the linkage 24 is in contact with the stops 32 and 34 respectively. Here, both the quantity of fuel and also the strength of the field-current will be changed within a certain limited region.

In the control device shown in Fig. 5, the fuel regulator 9 is influenced in the same way as in the plant according to Fig. 1. On the other hand, the field-current regulator 7 is only influenced as it is in the plant according to Fig. 1, when the strength of the field-current is weakened by displacement in the direction from the position 10 towards the position 0. When increasing the field-current strength by displacing in the opposite direction, the regulating motion is retarded, so that the time taken to adjust is lengthened. For this purpose, a braking piston 43 is connected to the linkage 24. When the contact lever 25 on the field-current regulator 7 moves in the direction from position 10 towards position 0, a gas or liquid with low resistance is drawn in through the valve 44. With movement in the contrary direction, this gas or liquid is pressed out with increased resistance through the throttle position 45. When the linkage 24 is moving to the left under the influence of the brake, it may be temporarily raised from the lever 21. It will, however, be led closer to the lever 21 by the spring 33, until it comes to rest on it or reaches the stop 34 by means of the plate of spring 33.

The control device shown in Fig. 6 sets the fuel regulator again in a third region of lowest speeds, so that a certain position of the fuel regulator is allocated to each position of the speed governor. The field-current regulator 7 has beyond the position 0 a further region in which a constant diminished field-current is set, corresponding to the position 0. In this region, the linkage 22 is drawn further to the right, by means of a slot 46 and the lever 21, so that the quantity of fuel is still further increased.

Here the plate of the spring 31, which at first rested on a movable stop 32, is pressed against the stronger spring 47. The spring 47 presses the movable stop 32 into the first two speed regions against the fixed stop 48. The spring 31 alone cannot raise the movable stop 38 from the fixed stop 48 of the spring 47. Only when the slot 46 lies on the pin of the lever 21, can it be raised and thereby increase further the quantity of fuel. Since each position of the lever 21 is allocated to a certain position of the speed governor 12, in the new third speed region a certain position of the fuel regulator 9 will also correspond to each position of the speed governor 12.

The spring member 35 acts in both directions. The spring 49 is pressed together when the supercharging safety device comes into action, whilst the spring 50 is pressed together when the fuel regulator 9 reaches the stop in the position for 0 fuel feed, but the lever 23 is displaced further in the sense of a reduction of the quantity of fuel.

The control device illustrated in Fig. 7 acts in the two first speed regions like the control device according to Fig. 6. Between the lever 21 and the fuel regulating linkage 9, a connection, effected only in one direction, acts in the third speed region. The spring member 35 therefore requires to be arranged to act only in one direction. On the control lever 21 an arm 51 is also fixed, which displaces the two-armed lever 52 after the first two speed regions have been passed through. In this way, the movable stop 32 is moved towards the right so that the spring plate fixed on the linkage 22 can follow it. Thereby the lever 23 is drawn after and the quantity of fuel further increased. When the fuel regulating linkage 9 comes into the regulating position 10 for the greatest quantity of fuel, it remains simply standing at its top, whilst the movable stop 32 can move still further towards the right.

In the control device illustrated in Fig. 8, where some parts have been omitted, the supercharging safety device 38 acts on the lever 23. In addition to the spring member 35 in the fuel regulating linkage 9, a spring member 53 is also fitted in the linkage 29. If the supercharging pressure is less than the pressure corresponding to the quantity of fuel to which the device is adjusted, the bellows 39 extend so greatly under the pressure of the spring 40, that, with the help of the linkage 54 and the fork 55 the pivot 30 of the lever 23 is pushed towards the right. In this way, the fuel regulating linkage is brought into a position for a smaller quantity of fuel.

The device shown in Fig. 9 serves to increase the quantity of fuel during starting. The plate of the spring 31 rests against a movable stop 32 whose position is determined by the piston 56 through the bell-crank lever 52. This piston is influenced on the one hand by the spring 57 and on the other hand by a pressure medium flowing in through the pipe 58. A contact 59 closes an electric circuit by means of the coil 60 during starting so that the valve 61 is raised. Thereby pressure medium flows into the cylinder space of the piston 56, presses the piston downwards and displaces the bell-crank lever 52. In this way, the stop 32 is moved towards the right and consequently the fuel quantity is adjusted to a greater amount for starting. As soon as contact 59 reaches the open position after starting, the electric circuit is broken by the coil 60 and then the valve 61 can come into the closed position. The piston 56 is then raised by the pressure of the spring 57, and the stop 32 is again moved into its normal position. Liquid pumps, for instance, could also be used as speed governors.

I claim:

1. An electric generating plant for vehicle propulsion including an internal combustion engine, an electric generator driven by said engine, and an automatic regulating device that includes a speed governor driven by said engine, a control device influenced by said governor, a fuel regulator controlling the admission of fuel to said engine and influenced by said control device in the region of higher engine speeds only to admit a definite amount of fuel for each speed in that region, a field current regulator controlling the field current of said generator and influenced by said control device in the region of lower engine speeds only to provide a definite field current for each speed in that region, and output adjusting means that include a device for setting said governor to the desired speed and means for regulating the range of influence of said control device over said fuel regulator, said governor-setting-device and said influence-range-regulating means being adjusted in common by manipulation of said output adjusting means.

2. An electric generating plant according to claim 1 in which an additional control device influenced by the governor influences the fuel regulator in the region of lowest speeds only.

3. An electric generating plant according to claim 1 in which the engine is provided with supercharging means, a safety governing device influenced by the supercharging pressure, and an additional means for regulating the range of influence of the control device over the fuel regulator whereby the amount of fuel admitted to the engine can never exceed an amount appropriate to the existing supercharging pressure.

4. An electric generating plant according to claim 1 in which the engine includes a starting device and the fuel regulator is provided with an additional control device influenced by the starting device whereby an increased amount of fuel is admitted to the engine during the starting process independent of the influence of the speed governor.

5. An electric generating plant according to claim 1, characterized in that the region of higher speeds, in which the fuel regulator is influenced, and the region of lower speeds, in which the field-current regulator is influenced, are directly adjacent to each other.

6. An electric generating plant according to claim 1, characterized in that the region of higher speeds, in which the fuel regulator is influenced, and the region of lower speeds, in which the field-current regulator is influenced, are separated from each other by an intermediate region in which neither the fuel regulator nor the field-current regulator is influenced.

7. An electric generating plant as claimed in claim 1, characterized in that the region of higher speeds, in which the fuel regulator is influenced, and the region of lower speeds, in which the field-current regulator is influenced, overlap to a certain extent, and there the fuel regulator and also the field-current regulator are influenced.

OSKAR SCHLÄPFER.

REFERENCES CITED

The following references are of record in the file of this patent:

UNITED STATES PATENTS

| Number | Name | Date |
| --- | --- | --- |
| 1,216,237 | Lemp | Feb. 13, 1917 |
| 1,585,351 | Ionides | May 18, 1926 |
| 1,799,096 | Guernsey | Mar. 31, 1931 |
| 2,050,068 | Schaer | Aug. 4, 1936 |
| 2,055,209 | Schaer | Sept. 22, 1936 |
| 2,060,900 | Simmen | Nov. 17, 1936 |
| 2,131,527 | Sousedik | Sept. 27, 1938 |
| 2,145,611 | Schlaepfer | Jan. 31, 1939 |
| 2,172,298 | Sousedik | Sept. 5, 1939 |
| 2,175,681 | Brunner | Oct. 10, 1939 |
| 2,256,294 | Schlaepfer | Sept. 16, 1941 |
| 2,303,951 | Oswald | Dec. 1, 1942 |